Aug. 14, 1923.

E. O. STERNS 1,464,734

SYSTEM OF LUBRICATION

Filed May 26, 1922

INVENTOR
Edward O. Sterns.
BY
John J. Darnell
ATTORNEY

Patented Aug. 14, 1923.

1,464,734

UNITED STATES PATENT OFFICE.

EDWARD O. STERNS, OF COLUMBUS, OHIO, ASSIGNOR TO THE STERNS GAS ENGINE LUBRICATOR COMPANY, OF COLUMBUS, OHIO, A CORPORATION OF OHIO.

SYSTEM OF LUBRICATION.

Application filed May 26, 1922. Serial No. 563,868.

*To all whom it may concern:*

Be it known that I, EDWARD O. STERNS, a citizen of the United States, residing at Columbus, in the county of Franklin and State of Ohio, have invented certain new and useful Improvements in Systems of Lubrication; and I do hereby declare the following to be a full, clear, and exact description of the invention, such as will enable others skilled in the art to which it pertains to make and use the same.

My invention relates to lubricating systems having particular reference to a system for lubricating the combustion chamber of an internal combustion engine and has for its object the providing of a system which will be entirely automatic, contain all working parts entirely within the lubricant conduit and require such parts to be simple in construction but efficient and practical in operation.

With the above objects in view my invention consists in providing a lubricant supply source, a conduit leading from said source to the combustion chamber of an internal combustion engine and locating within said conduit means operable by the vibrations of the engine to regulate the quantity of lubricant to be carried to the combustion chamber and means operable by the suction created by the piston displacement for carrying such lubricant to the parts of the engine to be lubricated.

The invention further consists in parts and combination of parts, all of which will be hereinafter more fully set forth and claimed.

Figure 1:
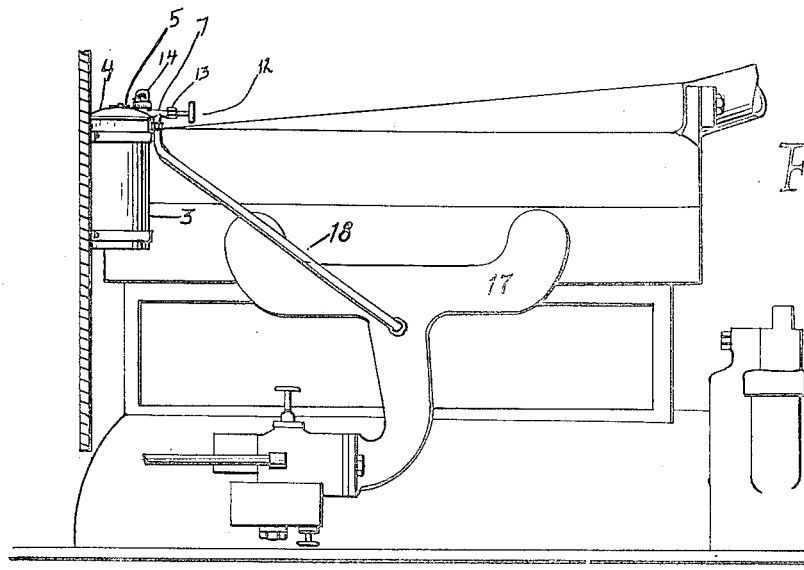

In the drawings Fig. 1 is a side elevation of an ordinary engine showing the manner I prefer to employ in carrying out my invention.

Figure 2:
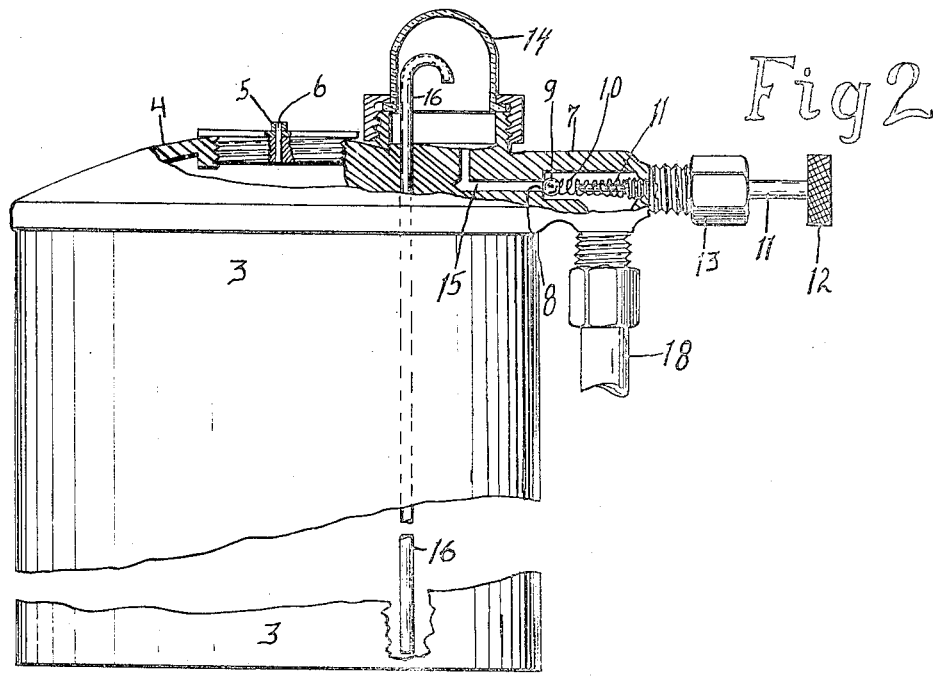

Fig. 2 is a view partially in section showing the detailed construction of the lubricant supply reservoir and the controlling mechanism.

3 represents the reservoir proper provided with a permanent closure 4 in which is mounted the screw threaded cap 5, for permitting the filling of the reservoir with a lubricant. A vent 6, is provided for allowing the lubricant to be carried away from the reservoir without creating a vacuum therein.

Extending from the closure 4 is a valve casing 7 having an annular valve seat 8 adapted to be normally closed by means of the ball valve 9 held in place by the spring 10. The tension of the spring 10 is determined by adjusting the stem 11 through the medium of the handle 12. The nut 13 acts both as a packing nut to prevent leakage and as a binding nut to prevent unintended rotation of the stem 11.

The valve casing 7 has communication with the sealed transparent chamber 14 through the passage 15, which chamber 14, in turn has direct communication with the lowermost portion of the reservoir 3, through the conduit 16.

Heretofore and before my invention, it has been attempted to control the supply of lubricant by a valve operated through the medium of the suction created by the cylinder displacements but in practice it has been found that fine adjustments of the valve are not accomplishable unless the valve is constructed on the well known needle or cone type, and that when such constructions are employed the valve is operable only as long as it can be kept free from "gumming up" which time is dependable entirely upon the quality of lubricant employed. Otherwise the flow of lubricant is either stopped or too great to permit proper functioning of the engine.

With my invention I eliminate these objections by employing the vibrations of the engine to displace and replace the ball valve 9 from its seat 8; the rapidity of which is equivalent to the speed of the engine, and then employ the vacuum created by the piston displacement to carry the lubricant through the valve casing and conduit to the explosion chamber of the engine.

Keeping this principle of operation in mind it will be seen that as the engine is idle the valve 9 holds the small amount of lubricant that may be in the passage 15 from passing through the valve case 7. As the engine is started the displacement of the pistons causes a suction pull, a part of which finds its way from the intake manifold 17 to the pipe 18 connected thereto. This suction continues on through the pipe 18 to the interior of the valve casing 7 and as the vibrations of the engine cause the ball valve 9 to be momentarily displaced from its seat 8, the suction continues on to the transparent sealed chamber 14, thereby causing a proportionate amount of lubricant to be drawn from the reservoir 3, through the conduit 16 and into said chamber 14. The lubricant then drops from the end of the conduit 16 and into the passage 15 and arrested at the valve seat 8 and ball valve 9. As the vibrations continue to displace the ball valve 9 a small quantity of lubricant passes into the valve casing 7 and from there is drawn through the intake manifold and into the combustion chamber of the engine. By viewing the quantity of lubricant dripping into the chamber 14, the proper amount of lubrication may be determined and by adjusting the position of the stem 11, the tension of the spring 10 is in turn adjusted and consequently the ball valve 9 is allowed more or less displacement through the vibrations of the engine thereby permitting more or less suction to pass through to the chamber 14 and necessarily controlling the amount of lubricant drawn from the reservoir 3.

Elaborations in the construction of the mechanism may be brought about, such as placing the chamber 14 or its equivalent and the handle 12 in the instrument board of the auto, without departing from the invention since I have merely set forth a simplified form of carrying out my invention and do not desire to limit myself to the mechanism or details thereof as they may be readily modified without departing from my invention.

Having thus described my invention what I wish to claim is:

1. In a system of lubrication the combination with an internal combustion engine of a lubricant supply source, a conduit connecting said source to the combustion chamber of said engine and means operable by the vibrations of said engine for controlling the supply of lubricant to the engine.

2. In a system of lubrication the combination with an internal combustion engine of a lubricant supply source, a conduit connecting said source to parts of the engine to be lubricated and means operable by the vibrations of said engine for controlling the supply of lubricant to the engine.

3. In a system of lubrication the combination with an internal combustion engine of a lubricant supply source, a conduit connecting said source to the intake manifold of said engine and means within said conduit operable by the vibrations of the engine for controlling the supply of lubricant to said engine.

4. In a system of lubrication the combination with an internal combustion engine of a lubricant supply source, a conduit connecting said source to the intake manifold of said engine and means within said conduit operable by the frequency of vibrations of the engine for regulating the supply of lubricant to the engine.

5. In a lubricating system of the type set forth the combination with an internal combustion engine of a lubricant supply source, a conduit connecting said source to the intake manifold of said engine, means within said conduit operable by the frequency of the engine vibrations for regulating the supply of lubricant and operable by the suction within said intake for conveying said lubricant to the parts of the engine to be lubricated.

6. In a lubricating system of the type set forth the combination with an internal combustion engine of a lubricant supply source, a conduit connecting said source to the parts of the engine to be lubricated and means within said conduit operable by the engine vibrations for controlling the supply of lubricant and employing the suction created within said engine for conveying said lubricant to the parts to be lubricated.

Signed at Cleveland in the county of Cuyahoga and State of Ohio this 24th day May 1922.

EDWARD O. STERNS.

Witnesses:
F. J. MILLER,
M. C. WAGNER.